(12) United States Patent
Faruque et al.

(10) Patent No.: US 9,290,142 B1
(45) Date of Patent: Mar. 22, 2016

(54) BUMPER MOUNTED DEPLOYABLE UPPER LEG CATCHER FOR PEDESTRIAN PROTECTION

(71) Applicant: Ford Global Technologies, LLC, Dearborn, MI (US)

(72) Inventors: Mohammed Omar Faruque, Ann Arbor, MI (US); Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/482,394

(22) Filed: Sep. 10, 2014

(51) Int. Cl.
  *B60R 19/48* (2006.01)
  *B60R 19/40* (2006.01)
  *B60R 19/18* (2006.01)
(52) U.S. Cl.
  CPC ............... *B60R 19/40* (2013.01); *B60R 19/18* (2013.01); *B60R 19/483* (2013.01)
(58) Field of Classification Search
  CPC ........ B60R 19/40; B60R 19/18; B60R 19/483
  See application file for complete search history.

(56) References Cited

U.S. PATENT DOCUMENTS 3,104,907 A * 9/1963 Seewalt ................. B60R 21/34
                                                                293/117

FOREIGN PATENT DOCUMENTS

| DE | 102005025775 A1 | 12/2006 |
|---|---|---|
| EP | 1024063 A2 | 8/2000 |
| EP | 1216170 B1 | 11/2005 |
| JP | 2003081052 A | 3/2003 |
| JP | 2013001227 A | 1/2013 |

OTHER PUBLICATIONS

Highway Loss Data Institute, Mercedes-Benz Collision Avoidance Features: Initial Results, HLDI Bulletin, vol. 29, No. 7, Apr. 2012.

* cited by examiner

*Primary Examiner* — Lori L Lyjak
(74) *Attorney, Agent, or Firm* — LeClairRyan

(57) ABSTRACT

A pedestrian protection apparatus for a motor vehicle is disclosed. The apparatus includes a catcher beam and a catcher beam support assembly including a catcher beam support to which the beam is attached. The support is movable between stowed and deployed positions. The apparatus includes a bumper energy absorber and a bumper beam. The assembly is positioned adjacent the absorber and is either substantially within or adjacent to the bumper beam. The apparatus includes a mechanical, electromechanical or pneumatic actuator to allow the support to move to its deployed position. A pedestrian impact sensor sends a signal to a control unit in the event of an imminent pedestrian impact. The control unit then signals the assembly to allow the catcher beam to move to its deployed position using the actuator. In the event of a false positive deployment, the actuator retracts the catcher beam to its stowed position.

20 Claims, 6 Drawing Sheets

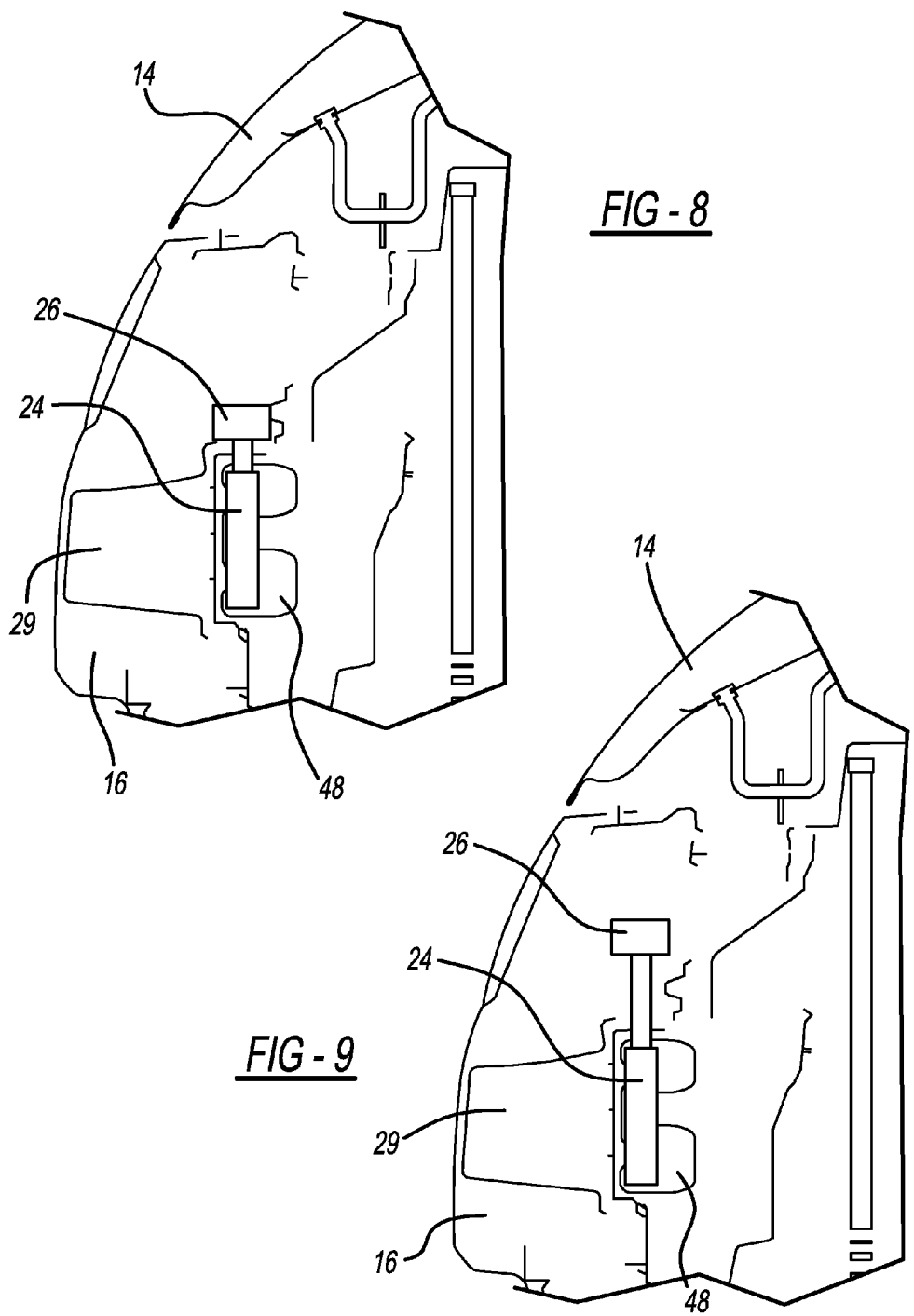

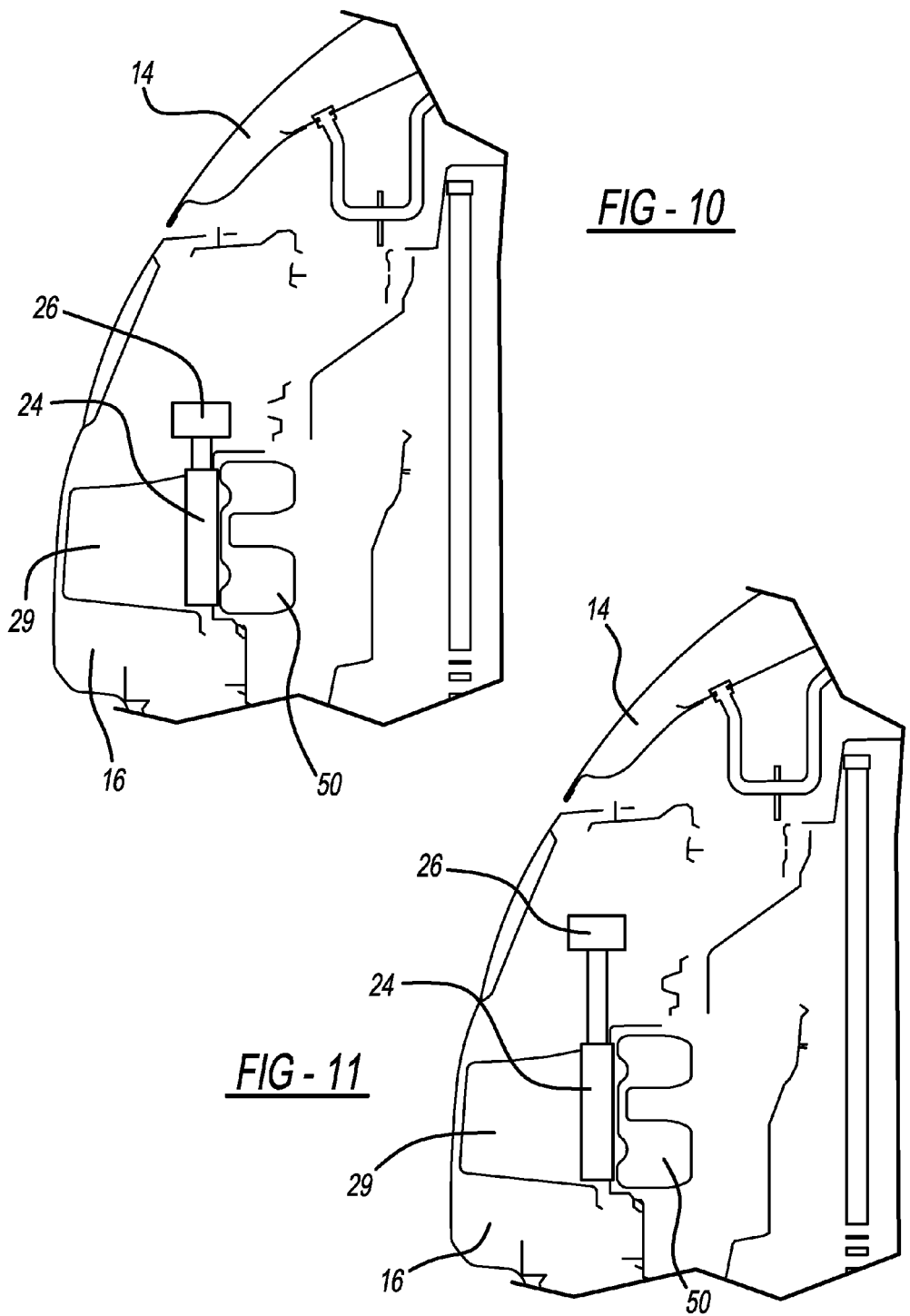

BUMPER MOUNTED DEPLOYABLE UPPER LEG CATCHER FOR PEDESTRIAN PROTECTION

TECHNICAL FIELD

The disclosed inventive concept relates generally to pedestrian protection systems for automotive vehicles. More particularly, the disclosed inventive concept relates to a pedestrian protection system that includes a pedestrian impact sensor that works in conjunction with deployable, bumper-mounted upper leg catchers that are movable between a stowed position and a deployed position in the event of an impact with a pedestrian.

BACKGROUND OF THE INVENTION

Pedestrian-vehicle impact events are unfortunate but known occurrences. It is known that in a pedestrian collision thirty-seven percent of injuries were suffered by lower extremities. (Crandall et al., "Designing Road Vehicles for Pedestrian Protection," *BMJ* [formerly *British Medical Journal*], 324 [7346], pp. 1145-1148), May 11, 2002.)

The front edge of the vehicle hood is typically a relatively stiff area that impacts an adult's upper leg during a pedestrian-vehicle impact event. The vehicle front and specifically the front overhang are designed to identify vehicle class and model type. In the case of the modern sports car, the front end is typically designed such that the vehicle has an overall low profile and a large hood to accommodate a high-power engine and matching powertrain. The front overhang of regular sedans and sports utility vehicles is designed to be stiff enough so that damage to the front end during a low speed crash is minimal. Larger vehicles, such as trucks, are often designed to enhance the sizes of the vehicle's grille and engine compartment, thus exaggerating the appearance of power and aggressiveness. In most of these cases the design aspects present challenges to the pedestrian during a collision.

The kinematics of a pedestrian during an impact depends on the characteristics of the vehicle front, its speed and the size of the pedestrian. If the center of gravity of a standing or walking pedestrian is higher than the leading edge of the vehicle then the pedestrian's body may at least partially wrap around the vehicle front or may be lifted into the air. The former is the most common result where the center of gravity is higher than the leading edge of the vehicle while the latter is the most common result in a high speed impact.

In the circumstance where an adult pedestrian at least partially wraps round the vehicle front it is the pedestrian's upper leg that is impacted by the edge of the hood causing injury to the upper leg. If the impact event involves a child then the child's head or other body parts could be impacted upon the edge of the hood causing serious injury.

Recognizing this risk of injury to pedestrians, according to the European New Car Assessment Programme ("Euro NCAP"), to achieve a five-star rating, all vehicles will need to be equipped with a pre-crash sensing system called Autonomous Emergency Braking (AEB) by 2014 and with pedestrian recognition system by 2016. Additionally, Euro NCAP phase-in star rating requirements put more emphasis on pedestrian protection which includes a pedestrian's upper leg.

In the United States, the National Highway Traffic Safety Administration is planning to introduce similar regulatory framework for pedestrian protection starting in 2016. Accordingly, global auto manufacturers urgently need new technologies to design front end of the vehicles to minimize injuries to pedestrian and to achieve highest possible safety ranking by regulatory agencies.

New pedestrian technologies can benefit from using signal from existing Autonomous Emergency Braking (AEB) systems with pedestrian detection. Based on that signal, technology countermeasures can be deployed to reduce injuries to pedestrians.

Such pre-crash sensing system for pedestrian detection may not need to be 100% reliable. In the event of a false positive signal resulting in a false deployment, the pedestrian technology can be reset to non-deployed state automatically after a pre-determined time delay and be available for next use case.

Known tests, such as the EuroNCAP pedestrian protection test protocol, includes measures to protect the upper leg from impacting the hood (or bonnet) leading edge ("BLE"). The challenge in this test is that the impact velocity, angle as well as impact kinetic energy (KE) and legform mass are determined by look-up diagrams in the test protocol. Employed standards are based on the bonnet leading edge height ("BLEH") and the bumper lead ("BL") of the target vehicle at the impact location. The styling of a vehicle is determined at an early stage of a vehicle program which can result in a high initial KE level in the upper legform test.

A known countermeasure to meet known pedestrian protection requirements is to incorporate a deployable hood into the vehicle. However, while providing arguable improvements in the state of the art, some deployable hood designs do not result in satisfactory pedestrian protection at the front of the vehicle.

Accordingly, there is a need for a practical and effective system to protect the upper leg of a pedestrian in a pedestrian-vehicle impact event. As in so many areas of vehicle technology there is always room for improvement related to the protection of pedestrians in a pedestrian-vehicle impact event.

SUMMARY OF THE INVENTION

The disclosed inventive concept integrates elements of an active safety system with elements of a passive safety system. By so doing, the disclosed inventive concept offers a technical solution to the pedestrian upper leg impact requirements with minimal changes to the vehicle insofar as the active safety system (AEB) having pedestrian detection capabilities is already present in many newer vehicles. Such systems are capable of detecting the presence of a pedestrian a few hundred milliseconds (generally between about 400 and 500 ms) prior to impact with the vehicle. The disclosed inventive concept uses a pedestrian pre-impact sensing signal from such a system to deploy a bumper mounted upper leg catcher to minimize injury to the upper leg of the pedestrian.

Once the pre-impact sensing system of the disclosed inventive concept confirms an impending pedestrian impact, a signal is sent to a control module that causes the deployment of an upper leg catcher beam upwards toward the grille area, thus minimizing harm to the pedestrian. The catcher beam support assembly can be mounted to the front or back side of the vehicle bumper beam depending on the effectiveness of the catcher beam as determined by computer aided engineering (CAE) analysis or by another means of analysis. The catcher beam support assembly allows for deployment or retraction of a catcher beam through the use of an extendable support mechanism. A deployed catcher beam support assembly may be readily reset in the event of a deployment due to a false positive signal.

More particularly, the pedestrian protection apparatus for a motor vehicle of the disclosed inventive concept includes a catcher beam and a catcher beam support assembly including a catcher beam support to which the catcher beam is attached. The catcher beam support is movable between a stowed position and a deployed position. The apparatus further includes a bumper energy absorber. The catcher beam support assembly is positioned adjacent the absorber.

The pedestrian protection apparatus of the disclosed inventive concept further includes an actuator for moving the catcher beam support from the stowed position to the deployed position. The actuator may be of any of several mechanical, electromechanical or pneumatic types of actuators, including, but not limited to, a resilient member such as a conical spring.

A pedestrian impact sensor is provided to send a signal to a control unit in the event that an impact with a pedestrian is imminent. The control unit then sends a signal to the catcher beam support assembly which allows the catcher beam to move from its stowed position to its deployed position.

The catcher beam support assembly is attached to the motor vehicle at a strategic location, such as adjacent a bumper energy absorber and either substantially within or in front of a bumper beam. Thus positioned, neither the catcher beam support assembly nor the catcher beam interferes with engine cooling or restricts air flow to the cooling system in its stowed or retracted position.

A locking pin is attached to the catcher beam support assembly to maintain the catcher beam support in its stowed position. A controller is connected to the control unit. In the event that an imminent pedestrian impact is sensed, the controller receives a signal from the control unit to move the pin from its locked position to its unlocked position, thus allowing the catcher beam support and its associated bumper beam to move to the deployed position.

A catcher beam reset system is provided to reset the catcher beam support to the stowed position in the event of a false positive signal. The catcher beam reset system includes a retractor.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein:

FIG. 7 is a diagrammatic view showing the catcher beam of the disclosed inventive concept in its deployed state;

FIG. 8 is a sectional view of the front of a vehicle having the bumper-mounted deployable upper leg catcher for pedestrian protection according to the disclosed inventive concept positioned inside and through the bumper beam and behind the energy absorber, the catcher beam support assembly shown in its retracted or stowed state;

FIG. 9 is a view similar to that of FIG. 8 but showing the catcher beam support assembly in its deployed state;

FIG. 10 is a sectional view of the front of a vehicle having the bumper-mounted deployable upper leg catcher for pedestrian protection according to the disclosed inventive concept positioned in front of the bumper beam and behind the energy absorber, the catcher beam support assembly shown in its retracted or stowed state; and FIG. 11 is a view similar to that of FIG. 10 but showing the catcher beam support assembly in its deployed state.

DETAILED DESCRIPTION OF THE PREFERRED EMBODIMENT

Figure 1:
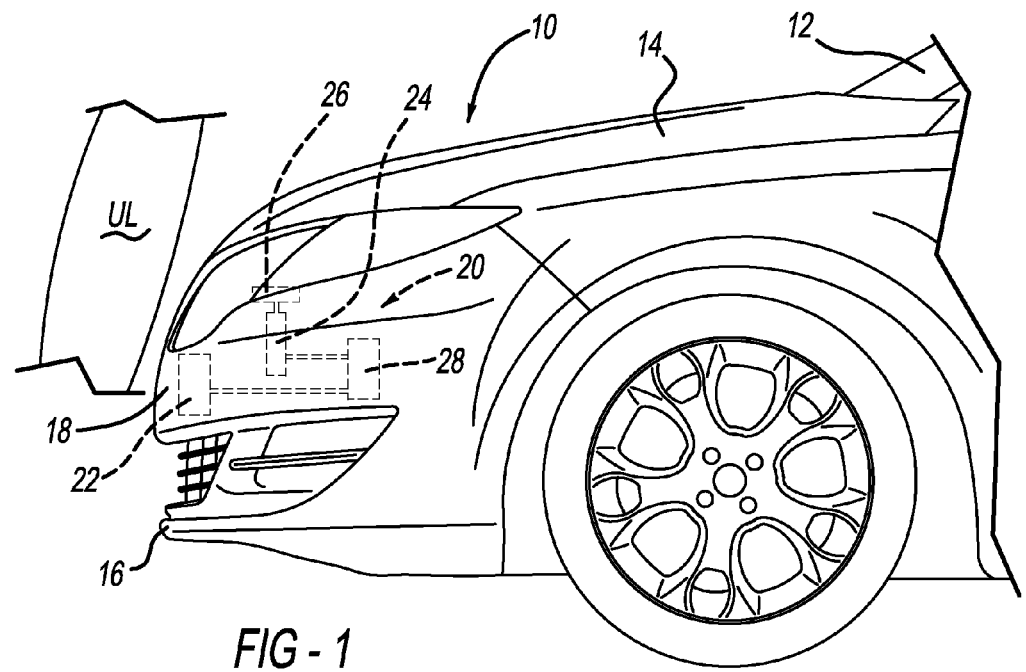
FIG. 1 is a side view of the front of a vehicle having the bumper-mounted deployable upper leg catcher for pedestrian protection relative to the upper leg of a pedestrian.

In the following figures, the same reference numerals will be used to refer to the same components. In the following description, various operating parameters and components are described for different constructed embodiments. These specific parameters and components are included as examples and are not meant to be limiting.

In general, the disclosed invention provides an injury mitigation system for a vehicle that provides a more cost-effective solution compared with known technologies through the provision of a deployable upper leg catcher usable on a motor vehicle for pedestrian protection.

Referring to FIG. 1, a side view of the front of a motor vehicle having the bumper-mounted deployable upper leg catcher for pedestrian protection according to the disclosed inventive concept is illustrated and is generally shown as 10. The motor vehicle 10 is shown relative to the upper leg UL of a pedestrian.

The motor vehicle 10 includes a windshield 12, an engine hood 14 forward of the windshield 12, and a front fascia 16 forward of the engine hood 14. The engine hood 14 includes a leading edge 18. The engine hood 14 is in its un-lifted or resting condition.

It is to be understood that the configuration of the motor vehicle shown 10 shown in FIG. 1 is only suggestive and is not intended as limiting. Indeed, the disclosed inventive concept can have application to any motor vehicle having an engine hood, including, but not limited to, passenger vehicles, sport utility vehicles, trucks, and recreational vehicles.

FIG. 1 also illustrates a deployable upper leg catcher system, generally illustrated as 20, generally positioned within the front portion of the vehicle 10. The deployable upper leg catcher system 20 includes a pedestrian impact sensor 22 and a catcher beam support assembly 24 having a catcher beam 26 attached thereto. The catcher beam support assembly 24 is positioned such that, on deployment in the event that the presence of a pedestrian is sensed, the catcher beam 26 is deployed upwards toward the grille area of the vehicle. The pedestrian impact sensor 22 and the catcher beam support assembly 24 are operatively associated with a control unit 28.

Figure 2:
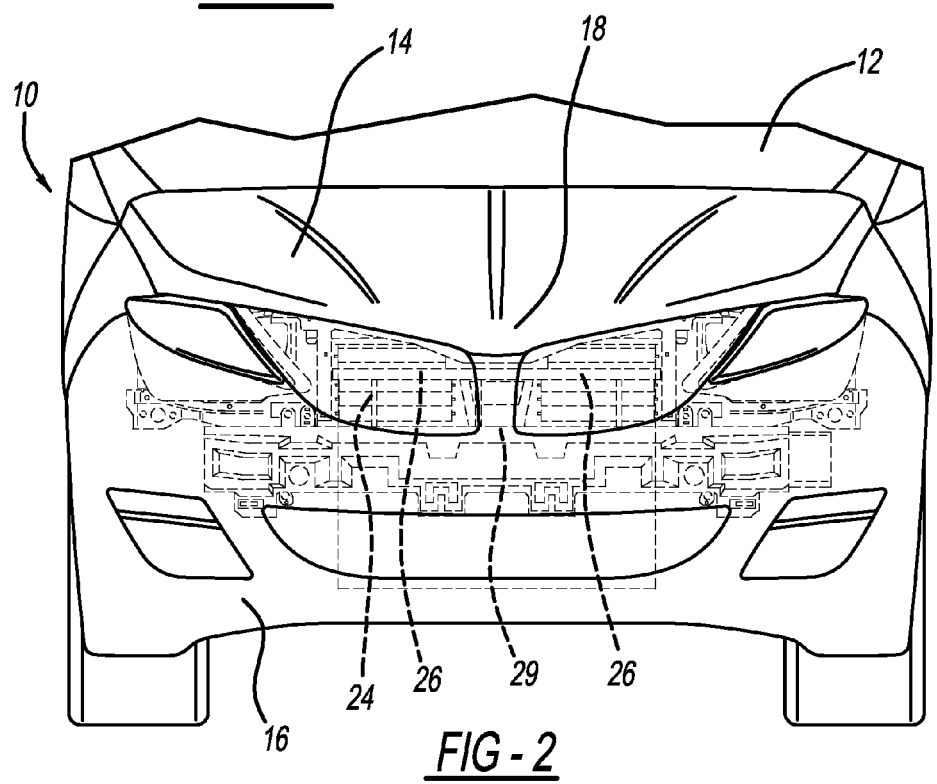
FIG. 2 is a front view of a vehicle having the bumper-mounted deployable upper leg catcher for pedestrian protection according to the disclosed inventive concept illustrating the vehicle front interior components shown in broken lines.
Figure 3:
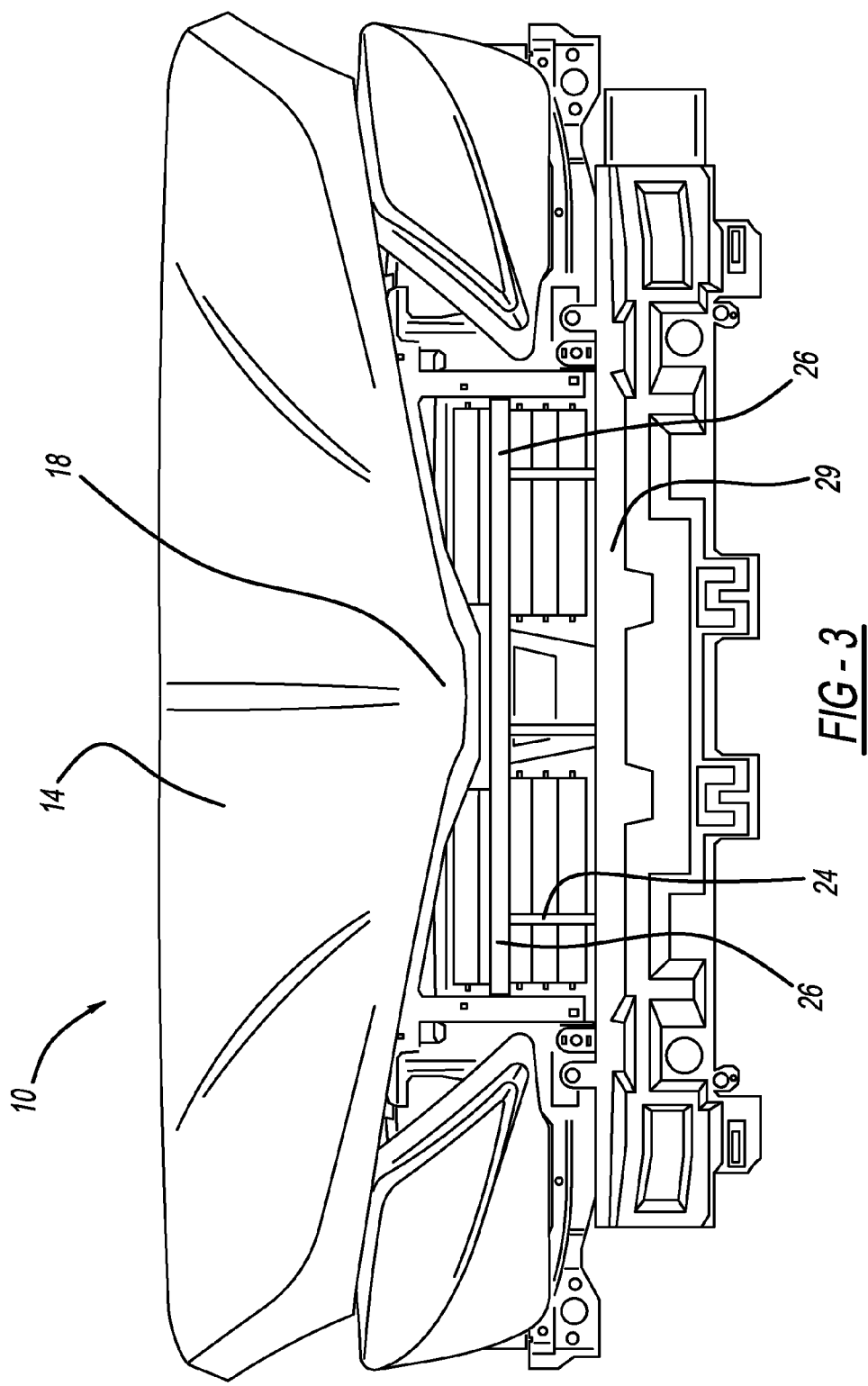
FIG. 3 is a view similar to that of FIG. 2 but illustrating the vehicle front interior components.

The catcher beam 26 and a portion of the catcher beam support assembly 24 are illustrated in FIG. 2 which is a front view of the motor vehicle 10 in which the front interior components of the vehicle 10 are shown in broken lines. The catcher beam 26 and a portion of the catcher beam support assembly 24 are also illustrated in FIG. 3 which more fully illustrates the front interior components of the vehicle 10. Both of these figures illustrate a bumper energy absorber 29.

In FIG. 2, the bumper energy absorber 29 is illustrated in broken lines. In FIG. 3, the bumper energy absorber 29 is illustrated in solid lines. In both figures, the catcher beam support assembly 24 is partially hidden from view by the presence of the bumper energy absorber 29.

Figure 4:
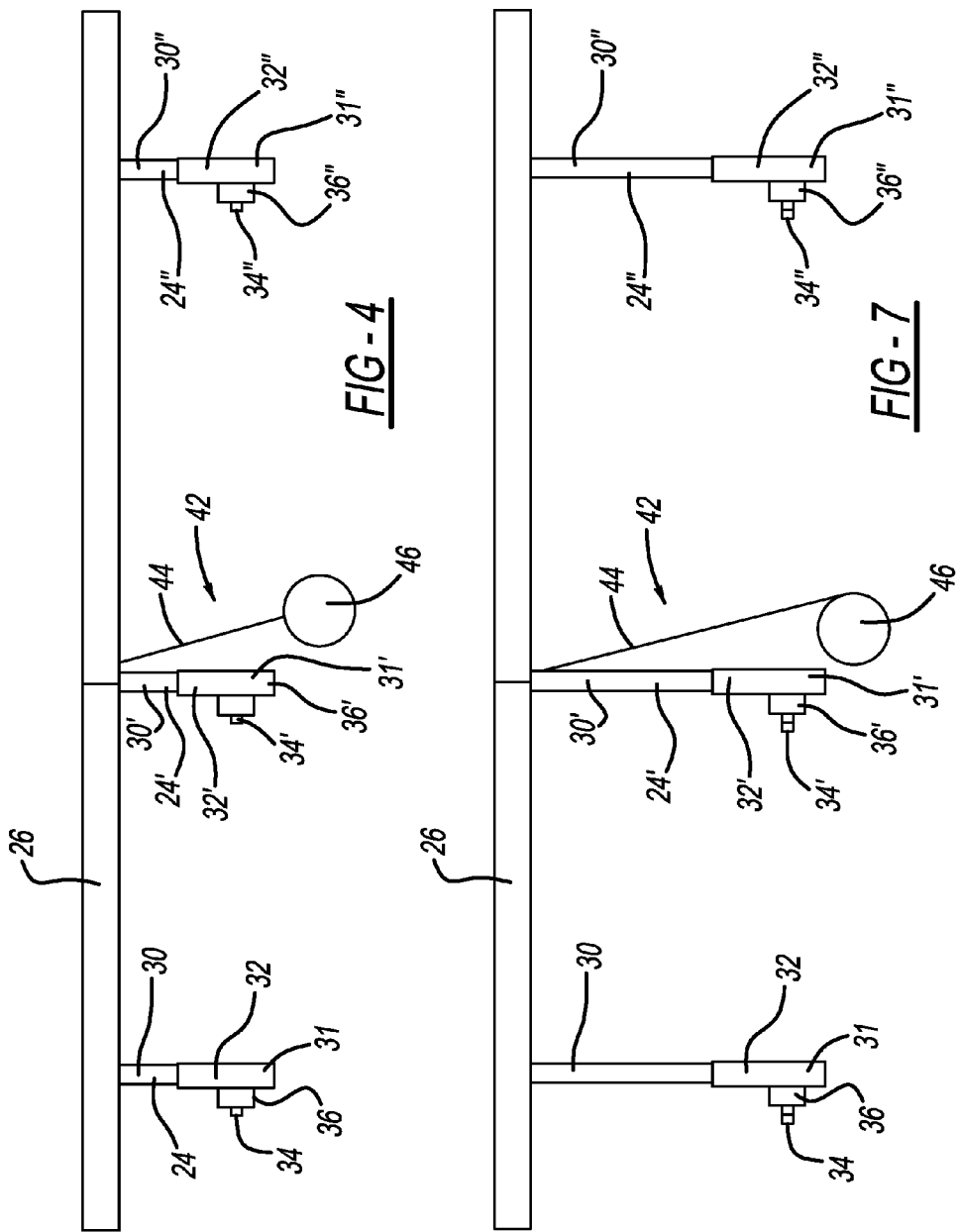
FIG. 4 is a diagrammatic view showing the catcher beam of the disclosed inventive concept in its retracted or stowed state.

The catcher beam support assembly 24 may have a number of different configurations. A preferred but not exclusive configuration of the catcher beam support assembly 24 according to the disclosed inventive concept is illustrated in detail in FIGS. 4 through 6. Referring to FIG. 4, the catcher beam 26 is attached to the catcher beam assembly 24 as well as to catcher beam assemblies 24' and 24". The catcher beam assemblies 24, 24' and 24" include catcher beam supports 30, 30' and 30", respectively. The catcher beam supports 30, 30' and 30" are movably attached to catcher beam support position regulators 32, 32' and 32" respectively. The catcher beam support position regulators 32, 32' and 32" include outer tubes 31, 31' and 31". The catcher beam support position regulators 32, 32' and 32" further include locking pins 34, 34' and 34" and associated locking pin position controllers (such as, but not limited to, solenoids) 36, 36' and 36" respectively. In FIG. 4, the locking pins 34, 34' and 34" are illustrated as being in their locked positions.

Figure 5:
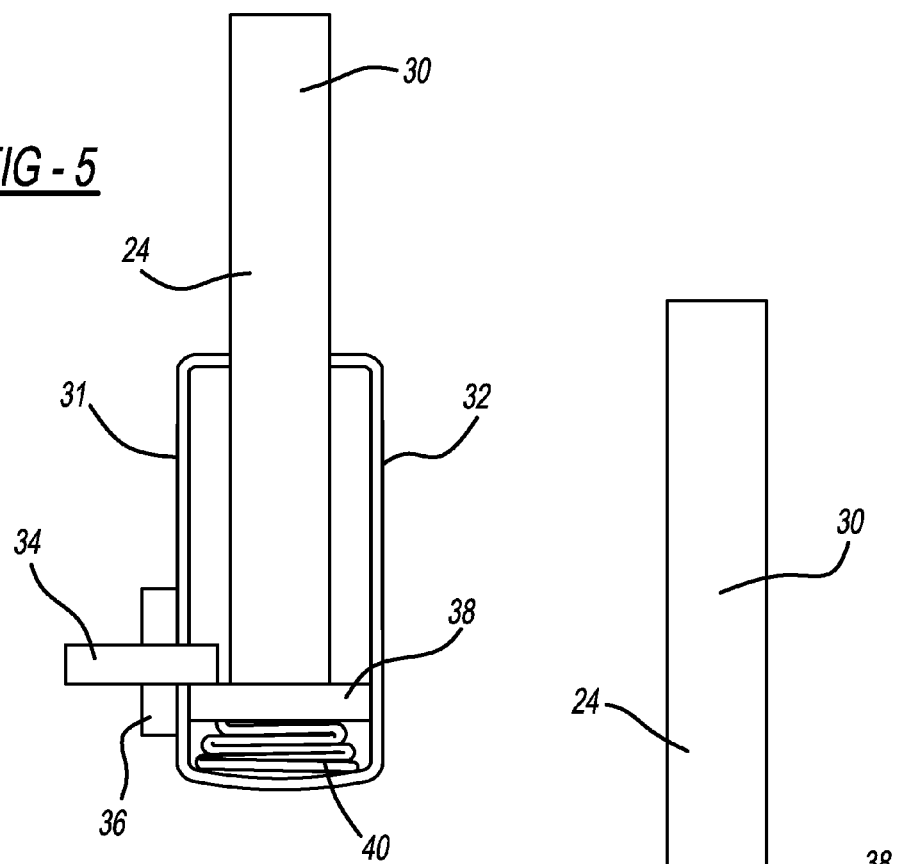
FIG. 5 is a cross-sectional view of the catcher beam support assembly in its retracted or stowed state.

More particularly, and with reference to FIG. 5 which illustrates the catcher beam assembly 24 in its locked position, the catcher beam support 30 includes a locking plate 38 against which the locking pin 34 is engaged when in its locked position. A resilient member, in this case a conical spring 40, is illustrated in its compressed state as would be the case when the catcher beam assembly 24 is in its locked position. It is to be understood that while a spring system is illustrated in the figures and is discussed in relation thereto, movement of the catcher beam 26 may be made by other extendable support mechanisms, such as through the utilization of a telescoping arm or electro-mechanical actuators.

Figure 6:
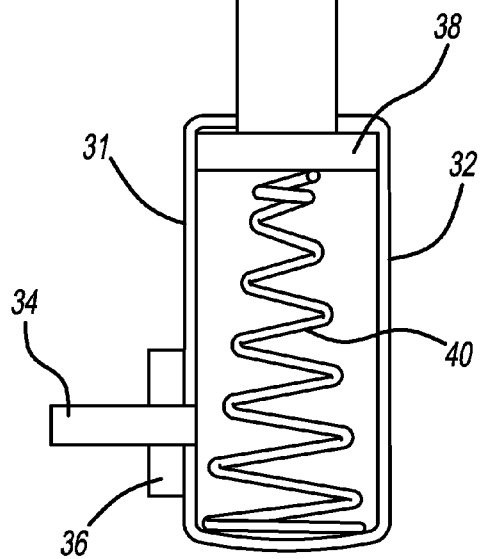
FIG. 6 is a cross-sectional view of a catcher beam support assembly in its deployed state.

In the event that the pedestrian impact sensor 22 senses the impending impact of a pedestrian upon the fascia 16, a signal is sent to the control unit 28 which, in turn, sends a signal to the catcher beam assembly 24 to cause the locking pin position controller 36 to move the locking pin 34 from its locking plate engaging position illustrated in FIG. 5 to its released or open position illustrated in FIG. 6. As illustrated in FIG. 6, with the movement of the locking pin 34 to its released or open position, the restraining force applied to the conical spring 40 is released, causing the catcher beam support 30 and its attached catcher beam 26 to be moved upward, as illustrated in FIG. 7, thereby providing softer engagement of the pedestrian's leg or other body parts in the event of a vehicle impact.

A catcher beam reset system is preferably provided to reset the catcher beam 26 to its retracted or stowed state such as in the case of a false deployment. The catcher beam reset system allows for the catcher beam 26 to be retracted from its deployed position and reseat either after a set time delay (for example, 2 to 3 minutes) to ensure that there indeed was no impact and the signal was false or by the operator through, for example, the push of a button. If retracted, the catcher beam reset system allows the catcher beam 26 to be returned to its design position.

This catcher beam reset system, generally illustrated as 42 in FIGS. 4 and 7, is a spring-assist cable and pulley arrangement that includes at least one cable 44 attached to a retractor such as a motor or similar mechanical device 46. The catcher beam retractor system 42 may also operate the release of the locking pin 34 according to another embodiment of the disclosed inventive concept.

The position of the catcher beam assembly 24 and its associated catcher beam 26 within the front portion of the vehicle may be varied depending on packaging requirements. Examples of placement alternatives for the catcher beam assembly 24 are illustrated in FIGS. 8 through 11. A first arrangement is illustrated in FIGS. 8 and 9 and a second arrangement is illustrated in FIGS. 10 and 11. Other locations of the catcher beam assembly 24 are possible without deviating from the spirit of the disclosed inventive concept.

Referring to FIGS. 8 and 9, the catcher beam assembly 24 is positioned vehicle-rearward of the bumper energy absorber 29 and at least partially within a bumper beam 48. FIG. 8 illustrates the catcher beam assembly 24 in its retracted or stowed state whereby the catcher beam 26 is lowered. FIG. 9 illustrates the catcher beam assembly 24 in its deployed state whereby the catcher beam 26 is raised to its upper leg-engaging position.

Referring to FIGS. 10 and 11, the catcher beam assembly 24 is positioned vehicle-rearward of the bumper energy absorber 29 and vehicle-forward of a bumper beam 50. FIG. 10 illustrates the catcher beam assembly 24 in its retracted or stowed state whereby the catcher beam 26 is lowered. FIG. 11 illustrates the catcher beam assembly 24 in its deployed state whereby the catcher beam 26 is raised to its upper leg-engaging position.

It is to be understood that while FIGS. 8 and 9 illustrate the catcher beam assembly 24 being positioned at least partially within the bumper beam 48 and FIGS. 10 and 11 illustrate the catcher beam assembly 24 as being positioned in front of the bumper beam 50, the catcher beam assembly 24 may also be mounted on the back side of the bumper beam. The optimum placement of the catcher beam assembly 24 relative to the bumper beam on a given vehicle is determined based on the effectiveness of the bumper beam catcher 24 as determined by any of several analytical methods.

The length, cross-section and type of material used in the catcher assembly of the disclosed inventive concept may all be determined based on many factors, including the styling of the front end of the vehicle. Ultimately, these variables may be determined through the use of engineering analysis.

Thus the disclosed invention as set forth above overcomes the challenges faced by known pedestrian protection sensing systems for vehicles in a number of ways, such as by reducing complexity and cost while providing effective protection for the pedestrian. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A pedestrian protection apparatus for a motor, the apparatus comprising:
    a catcher beam;
    a bumper energy absorber;
    a catcher beam support assembly positioned adjacent said absorber, said assembly including a catcher beam support to which said catcher beam is attached, said support being movable between stowed and deployed positions;
    a locking pin for retaining said support in said stowed position; and
    an actuator for moving said support to said deployed position.

2. The pedestrian protection apparatus of claim 1 wherein said actuator is a spring.

3. The pedestrian protection apparatus of claim 1 further including a pedestrian impact sensor operatively associated with said catcher beam support assembly.

4. The pedestrian protection apparatus of claim 3 further including a control unit connected to said pedestrian impact sensor, said catcher beam support assembly being connected to said control unit.

5. The pedestrian protection apparatus of claim 1 further including a bumper beam and wherein at least a portion of said catcher beam support assembly is positioned within said bumper beam.

6. The pedestrian protection apparatus of claim 1 further including a bumper beam and wherein said bumper beam has a front side and wherein at least a portion of said catcher beam support assembly is attached to said front side.

7. The pedestrian protection apparatus of claim 1 further including a controller associated with said locking pin to move said locking pin between a locked position and an unlocked position.

8. The pedestrian protection apparatus of claim 1 further including a catcher beam reset system to reset said catcher beam support to said stowed position, said catcher beam reset system to reset including a retractor.

9. A pedestrian protection apparatus for a motor vehicle, the apparatus comprising:
   a catcher beam;
   a catcher beam support assembly including a catcher beam support to which said catcher beam is attached, said catcher beam support being movable between a stowed position and a deployed position; and
   a bumper energy absorber, said assembly being positioned adjacent said absorber.

10. The pedestrian protection apparatus of claim 9 wherein said catcher beam support assembly includes an actuator for moving said catcher beam support from said stowed position to said deployed position.

11. The pedestrian protection apparatus of claim 10 wherein said actuator is a spring.

12. The pedestrian protection apparatus of claim 9 further including a pedestrian impact sensor operatively associated with said catcher beam support assembly.

13. The pedestrian protection apparatus of claim 12 further including a control unit connected to said pedestrian impact sensor, said catcher beam support assembly being connected to said control unit.

14. The pedestrian protection apparatus of claim 9 further including a bumper beam.

15. The pedestrian protection apparatus of claim 14 wherein at least a portion of said catcher beam support assembly is positioned within said bumper beam.

16. The pedestrian protection apparatus of claim 14 wherein said bumper beam has a front side and wherein at least a portion of said catcher beam support assembly is attached to said front side.

17. The pedestrian protection apparatus of claim 9 further including a locking pin to maintain said catcher beam support in its stowed position.

18. The pedestrian protection apparatus of claim 17 further including a controller associated with said locking pin to move said locking pin between a locked position and an unlocked position.

19. The pedestrian protection apparatus of claim 9 further including a catcher beam reset system to reset said catcher beam support to said stowed position, said catcher beam reset system to reset including a retractor.

20. A pedestrian protection apparatus for a motor vehicle, the apparatus comprising:
   a catcher beam;
   a catcher beam support assembly including a catcher beam support to which said catcher beam is attached, said support being movable between stowed and deployed positions;
   a beam support locking pin movable between locked and unlocked conditions;
   a locking pin controller for moving said pin between said conditions; and
   an actuator for moving said support to said deployed position.

* * * * *